US005621775A

United States Patent [19]
Etienne

[11] Patent Number: 5,621,775
[45] Date of Patent: Apr. 15, 1997

[54] DEVICE FOR JUSTIFYING A DIGITAL BIT STREAM AT REGULAR INTERVALS

[75] Inventor: Jean-Paul Etienne, St Quay-Perros, France

[73] Assignee: Alcatel Cit, Paris, France

[21] Appl. No.: 324,609

[22] Filed: Oct. 18, 1994

[30] Foreign Application Priority Data

Oct. 20, 1993 [FR] France ................................. 93 12497

[51] Int. Cl.⁶ ..................................................... H04L 7/00
[52] U.S. Cl. .......................................... 375/372; 370/516
[58] Field of Search ................................... 375/371, 372, 375/354; 365/189.01, 189.04, 189.05, 206; 370/100.1, 101, 102, 105.1, 105.3, 108, 84, 110.1, 111

[56] References Cited

U.S. PATENT DOCUMENTS

| | | | |
|---|---|---|---|
| 4,791,652 | 12/1988 | McEachern et al. | 370/102 |
| 5,331,641 | 7/1994 | Parruck et al. | 370/102 |
| 5,459,782 | 10/1995 | Volejnik | 375/372 |
| 5,471,476 | 11/1995 | Hiramoto | 370/105.1 |

FOREIGN PATENT DOCUMENTS

WO9318595  9/1993  WIPO .

OTHER PUBLICATIONS

Ralp Urbansky "Simulation Results and Field Trial Experience of Justification Jitter", *World Telecommunications Forum Tech. Symp.*, No. 2, Oct. 10, 1991, pp. 45–49 French Search Report FR 9312497.

Primary Examiner—Stephen Chin
Assistant Examiner—Amanda T. Le
Attorney, Agent, or Firm—Sughrue, Mion, Zinn, Macpeak & Seas

[57] ABSTRACT

A digital bit stream from a first synchronous link is timed by a first clock and is to be sent over a second synchronous link timed by a second clock. A device for justifying the bit stream at regular intervals includes a buffer memory. Respective pointers supply buffer memory write and read addresses. A value indicating how full the buffer memory is is calculated and compared to first and second threshold values to produce a justification command signal. The first and second variable threshold values are determined according to the phase difference between the header of a row received from the first link and the header of a row sent at the same time on the second link. The device finds an application in gateways at the input of and in telecommunication networks using the synchronous digital hierarchy.

10 Claims, 11 Drawing Sheets

DEVICE FOR JUSTIFYING A DIGITAL BIT STREAM AT REGULAR INTERVALS

BACKGROUND OF THE INVENTION

1. Field of the Invention

The invention concerns a device for justifying at regular intervals a digital bit stream made up of frames received on a first synchronous link timed by a first clock and to be sent on a second synchronous link timed by a second clock. The present invention can be applied to a gateway between two links within the same synchronous digital hierarchy network.

2. Description of the prior art

In this type of network digital bit streams are formed according to the synchronous multiplexing hierarchy defined in CCITT Recommendations G.707, G.708 and G.709. A digital bit stream, with a bit rate of 155 Mbit/s, for example, is made up of frames called synchronous transport modules structured in octets. Each module can be represented as an array having 270 columns and 9 rows. Each of the 9 rows can be regarded as a packet of 270 octets, including a header on nine octets and a payload on 261 octets. Each payload comprises data which is part of a data container known as a virtual container. There are several types of virtual container. Each virtual container includes a path overhead reserved for network management purposes and data.

The number of data bits conveyed in each virtual container is the same for all containers of the same type. On the other hand, the position of the containers relative to the frames is not fixed, because of phase differences due to propagation times in the network and because of positive or negative justification carried out at the network nodes. As a result, a container can straddle two consecutive modules. The header of the first row of a module is used to detect the start of the module. This does not usually coincide with the start of a virtual container. The start of a virtual container is identified by a pointer transmitted in the header of a specific row of each module.

When the digital bit stream is stored in a memory, the value of this pointer enables relative addressing of the information constituting the start of a container relative to the address at which the pointer is stored. The pointer is followed by a block of three spare octets which can be used for negative justification. This entails sending the data with an advance of three octets by using the three spare octets to send three data ochers, rather than three meaningless octets.

Positive justification entails sending the data with an advance of three octets by sending, after the three spare octets, three octets having no meaningful content, rather than three data octets, and by shifting the data so that there is always the same number of data octets in the container in question. One use of this positive or negative justification facility in a gateway connecting a plesiochronous network to a synchronous digital hierarchy network is to convert from a bit rate of 144 Mbit/s to a bit rate of 155 Mbit/s. It is also used to compensate phase differences between two synchronous links connected by a gateway within the same synchronous digital hierarchy network.

A gateway of this type includes a buffer memory whose capacity is very much less than one frame. The data, without the headers, is written into the buffer at the timing rate of a first clock which times the first link; it is read out at the timing rate of a second clock which times the second link. The difference between the current write address and the current read address of this memory is determined in order to find out how full the buffer is with data waiting to be read. This difference is compared to a first threshold value close to the capacity of the buffer to command positive justification if it exceeds this first threshold value. It is also compared to a second threshold value to command negative justification if it is less than the second threshold value. These two threshold values are fixed.

For a given frequency difference between the first and second clocks, this device supplies a periodic signal to command either positive or negative justification. For example, each period of this signal commands 87 consecutive justifications at regular intervals plus an empty interval having a duration equivalent to three justifications. A frequency difference of 5 ppm, for example, corresponds to a period of 30 ms for the justification control signal, i.e. a frequency in the order of 33 Hz.

If the digital bit stream passes through three gateways in succession, on leaving the third gateway the signal can feature 3×87 consecutive justifications followed by an empty interval whose duration is equivalent to 3×3 justifications in each period of the signal. This irregular justification is no problem in a synchronous digital hierarchy but produces phase jitter if the digital bit stream enters a plesiochronous network. This jitter can be filtered, but the lower the frequency the more difficult is it to filter the jitter.

An object of the invention is to facilitate this filtering by reducing this jitter at source, i.e. at each gateway through which the digital bit stream passes.

SUMMARY OF THE INVENTION

The invention consists in a device for justifying at regular intervals a digital bit stream received from a first synchronous link timed by a first clock and to be sent on a second synchronous link timed by a second clock, said binary bit stream comprising a continuous sequence of rows of bits, each row comprising a fixed total number of bits but including a payload comprising a variable number of bits and a header comprising a variable number of bits, the numbers of bits varying according to whether said row has been subjected to positive justification, negative justification or no justification, the device including:

a buffer memory into which said payload is written under the control of said first clock and from which said payload is read under the control of said second clock;

means for calculating a value indicative of how full said buffer memory is;

means for comparing said filling value to first and second threshold values to produce a negative justification command signal when it is greater than said first threshold value and to produce a positive justification command signal when it is less than said second threshold value; and means for determining first and second variable threshold values according to the phase difference between the header of a row received from said first link and the header of a row sent on said second link.

The above device reduces phase jitter resulting from justification carried out by a gateway because this justification is commanded at regular intervals by modulating the thresholds at which it is commanded, so as to force justification during the time interval which was "empty" in the prior art.

The invention will be better understood and other features of the invention will emerge from the following description and the appended drawings.

DETAILED DESCRIPTION OF THE PREFERRED EMBODIMENTS

Figure 1:
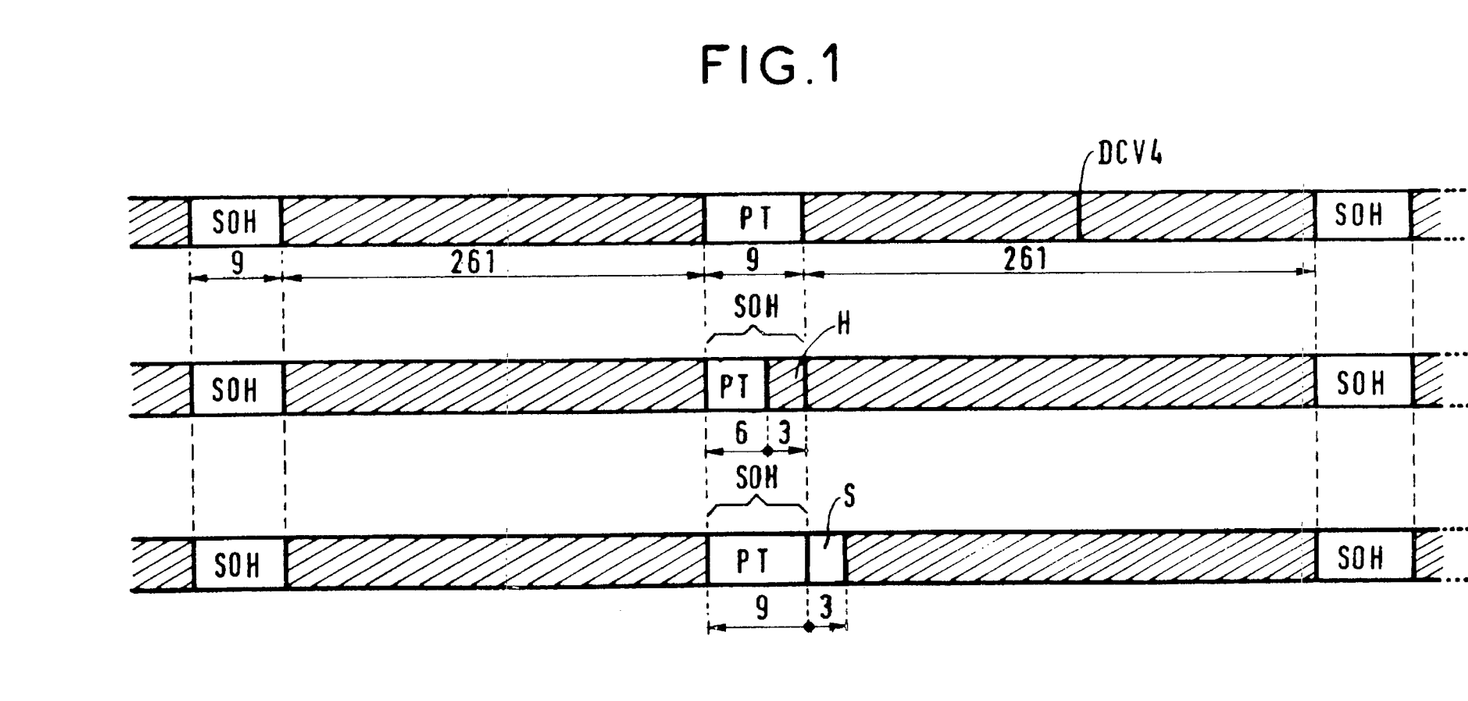
FIG. 1 shows a digital bit stream transmitted in a synchronous digital hierarchy network.

FIG. 1 shows on three separate lines three parts of a binary bit stream transmitted at 155 Mbit/s in a synchronous digital hierarchy network. Each of the three lines in the figure represents two rows of a respective level 1 synchronous transport module. The first row shown on each line does not include any justification. This row includes a header SOH on nine octets and a payload on 261 octets. Each virtual container is made up of nine consecutive rows. In the first line the second row does not include any justification but conveys data of two separate level 4 virtual containers which meet at the boundary DCV4.

The second row on the second line includes negative justification, i.e. shifting the payload of this row and subsequent rows so that data is written into a part H of the header of this row comprising three octets. This is authorized in only one row of each virtual container, this row having a special header including a pointer PT for identifying the position of the next boundary between two virtual containers.

The second row in the third line includes positive justification, i.e. shifting the payload of this row and subsequent rows in order to free up a free space S constituting a filler occupying three octets. This is authorized in only one row of each synchronous transport module, this row having a header including the pointer PT. The header includes nine octets, of which three are spare octets available for negative justification.

Figure 2:
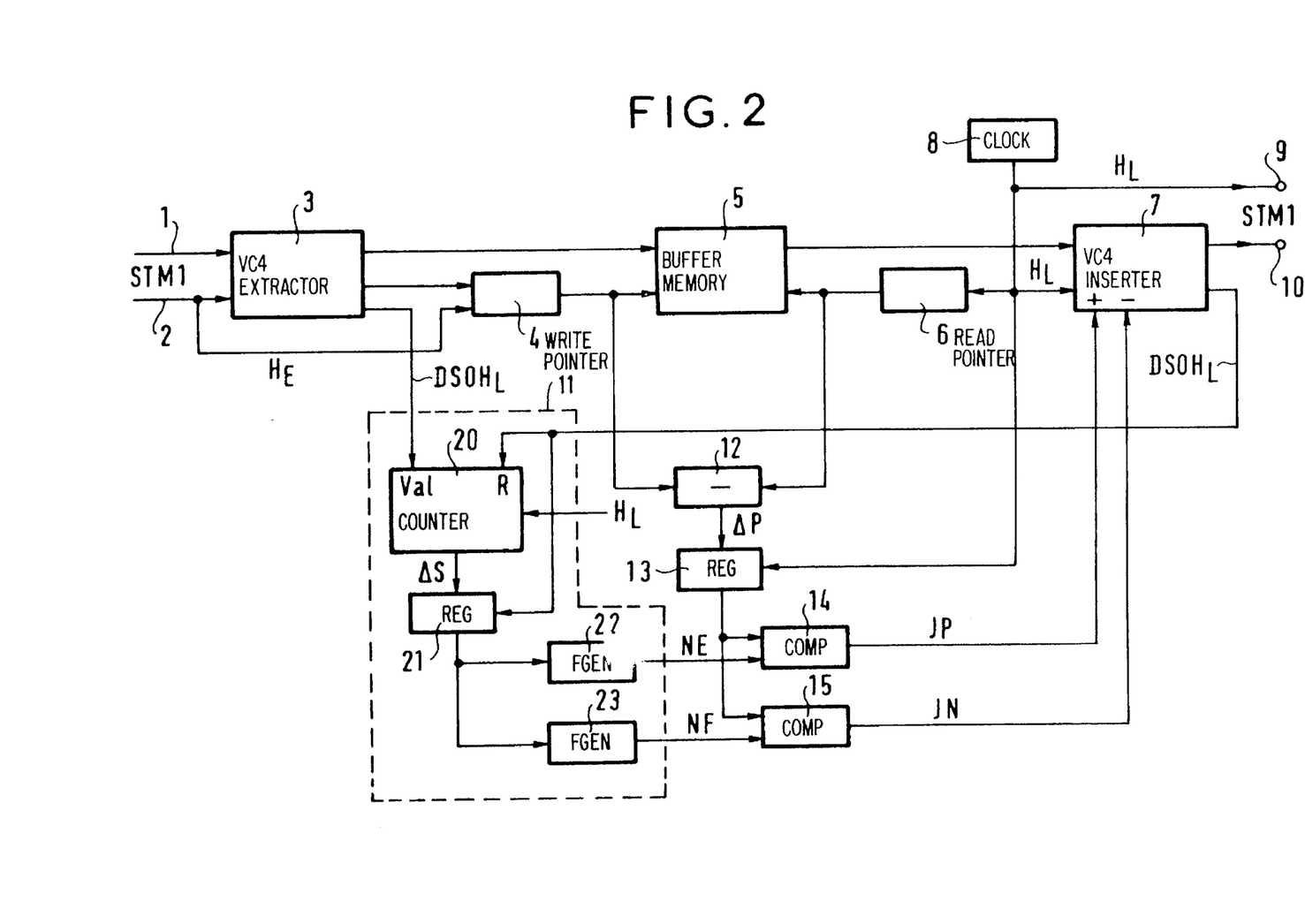
FIG. 2 shows the block diagram of one embodiment of a device of the invention.

FIG. 2 shows the block diagram of one embodiment of the invention. Its structure differs from that of a prior art circuit only in that it includes a circuit 11 supplying two threshold values NE and NF which are variable rather than fixed. This embodiment is connected by two input terminals 1 and 2 to a first link of a synchronous digital hierarchy network supplying on input 1 a digital bit stream made up of level 1 synchronous transport modules with a bit rate of 155 Mbit/s and on input 2 a clock signal $H_E$. It is additionally connected to a second link of the synchronous digital hierarchy network by two output terminals 9 and 10, respectively supplying a clock signal $H_L$ and a data stream made up of level 1 synchronous transport modules with a bit rate of 155 Mbit/s. These transport modules are as defined by CCITT Recommendation G.709.

This embodiment includes:

a circuit 3 for extracting level 4 virtual containers having two inputs respectively connected to the input terminals 1 and 2 and an output which outputs he containers half-octet by half-octet;

a write pointer 4 having an input connected to the input terminal 2 to receive the clock $H_E$ and an input connected to an output of the circuit 3 to authorize writing of data half-octets and to prohibit writing of header and filler half-octets;

a read pointer 6 having an input receiving a clock signal $H_L$;

a buffer memory 5 having a data input connected to the data output of the circuit 3, a write address input connected to an output of the pointer 4 and a read address input connected to an output of the pointer 6;

a circuit 7 for inserting level 4 virtual containers into level 1 synchronous transport modules; this circuit 7 has an input connected to a data output of the buffer memory 5, a clock input receiving the clock signal $H_L$, an output connected to the output terminal 10 to supply to the latter synchronous transport modules and an output supplying a signal $DSOH_L$ corresponding to the header of one row in a synchronous transport module sent to the output terminal 10;

a clock 8 supplying the clock signal $H_L$ to the output terminal 9, to an input of the read pointer 6 and to the clock input of the device 7;

the circuit 11 for determining the two threshold values NE and NF, and having inputs connected to an output of the circuit 3 to supply it a signal $DSOH_E$ corresponding to the header of a row in a transport module received at input terminal 1, an input connected to an output of the circuit 4 supplying it the signal $DSOH_L$ and two outputs respectively supplying the values NE and NF;

a subtractor 12 having an input connected to the output of the write pointer 4, an input connected to the output of the read pointer 6 and an output supplying a value $\Delta P$ (the difference between the current read address and the current write address in the buffer memory 5) for determining the filling value of the buffer memory 5;

a register 13 having an input connected to the output of the subtractor 12 and a control input connected to the output of the clock 8 to receive the signal $H_L$; and two comparators 14 and 15 having a common input connected to an output of the register 13 and each having an input connected to the respective outputs of the circuit 11 supplying the threshold values NE and NF and an output connected to a respective input of the circuit 7, to command positive and negative justification, respectively.

Except for the circuit 11, this circuit is conventional in that it constitutes a prior art circuit for justifying a digital bit stream.

The circuit 3 extracts each level 4 virtual container transported in the sequence of level 1 synchronous transport modules applied to input terminal 1. To this end it interprets the pointer which is part of the header of the fourth row of each synchronous transport module. The circuit 3 supplies to the buffer memory 5 only the virtual container. On the other hand, it supplies to the circuit 11 the signal $DSOH_E$ which corresponds to each header SOH at the start of each row of the module. The data conveyed by the container is written, half-octet by half-octet, into the buffer memory 5 at successive addresses supplied by the write pointer 4 incremented by the clock $H_E$ and enabled by the circuit 3.

The buffer memory 5 is read, half-octet by half-octet, at the read address supplied by the pointer 6, at the timing rate of the clock $H_L$. The difference $\Delta P$ between the read address and the write address indicates how full the buffer memory 5 is and thus represents the phase-shift between the read cycle and the write cycle in this memory. The difference $\Delta P$ is stored in the register 13 under the control of the clock signal $H_L$ and is then compared by the comparators 14 and 15 to the threshold value NE which corresponds to a memory that is almost empty and to the threshold value NF which corresponds to a memory that is almost full.

If $\Delta P$ is less than or equal to NE the memory 5 is almost empty. The comparator 14 then commands the circuit 7 to effect positive justification by inserting into the synchronous transport module currently being sent three additional octets having no meaningful content. On the other hand, if $\Delta P$ is greater than or equal to NF the memory 5 is almost saturated. The comparator 15 then commands the circuit 7 to effect negative justification by placing three data octets to be conveyed into three spare octets provided in the synchronous transport module currently being sent expressly for this negative justification.

Consider first the operation of the prior art circuit, after which the operation of the circuit 11 is explained. Variables relating to the prior art are "primed".

Figure 3:
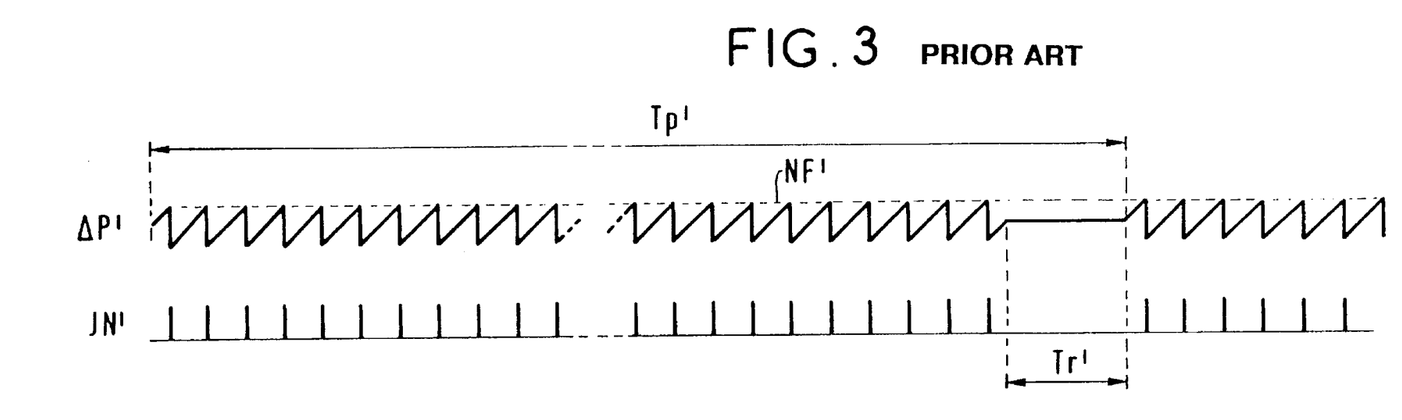
FIG. 3 shows timing diagrams illustrating the operation of a prior art device.

FIG. 3 shows the operation of a prior art circuit, a first line showing the value of the difference $\Delta P'$ between the read address and the current write address and on a second line the signal JN' commanding negative justification when the buffer memory 5 is tending towards saturation. These two signals have a period Tp'. Each period of the signal $\Delta P'$ has a sawtooth waveform part including 87 teeth followed by a constant level for a time interval Tr' whose duration corresponds to three teeth. In reality this graph represents the envelope of the difference $\Delta P'$, since $\Delta P'$ varies in steps each corresponding to one half-octet.

The positive slope of each tooth represents an increase in the difference $\Delta P'$ due to a timing difference between the incoming and outgoing synchronous transport modules, whereas the almost vertical negative franks correspond to negative justification suddenly reducing the difference $\Delta P'$ to a value lower than the threshold value NF'. During the interval Tr' the difference $\Delta P'$ remains at a constant value between the minimal value and the maximal value of this difference. During each period Tp' the signal JN' includes a series of 87 consecutive pulses respectively corresponding to the times at which the signal $\Delta P'$ reaches the threshold value NF' and an empty interval during the time interval Tr' in which the difference $\Delta P'$ never reaches the threshold value NF' since the difference $\Delta P'$ remains constant and the threshold NF' is constant.

Positive justification in a prior art circuit is similar.

Figure 4:
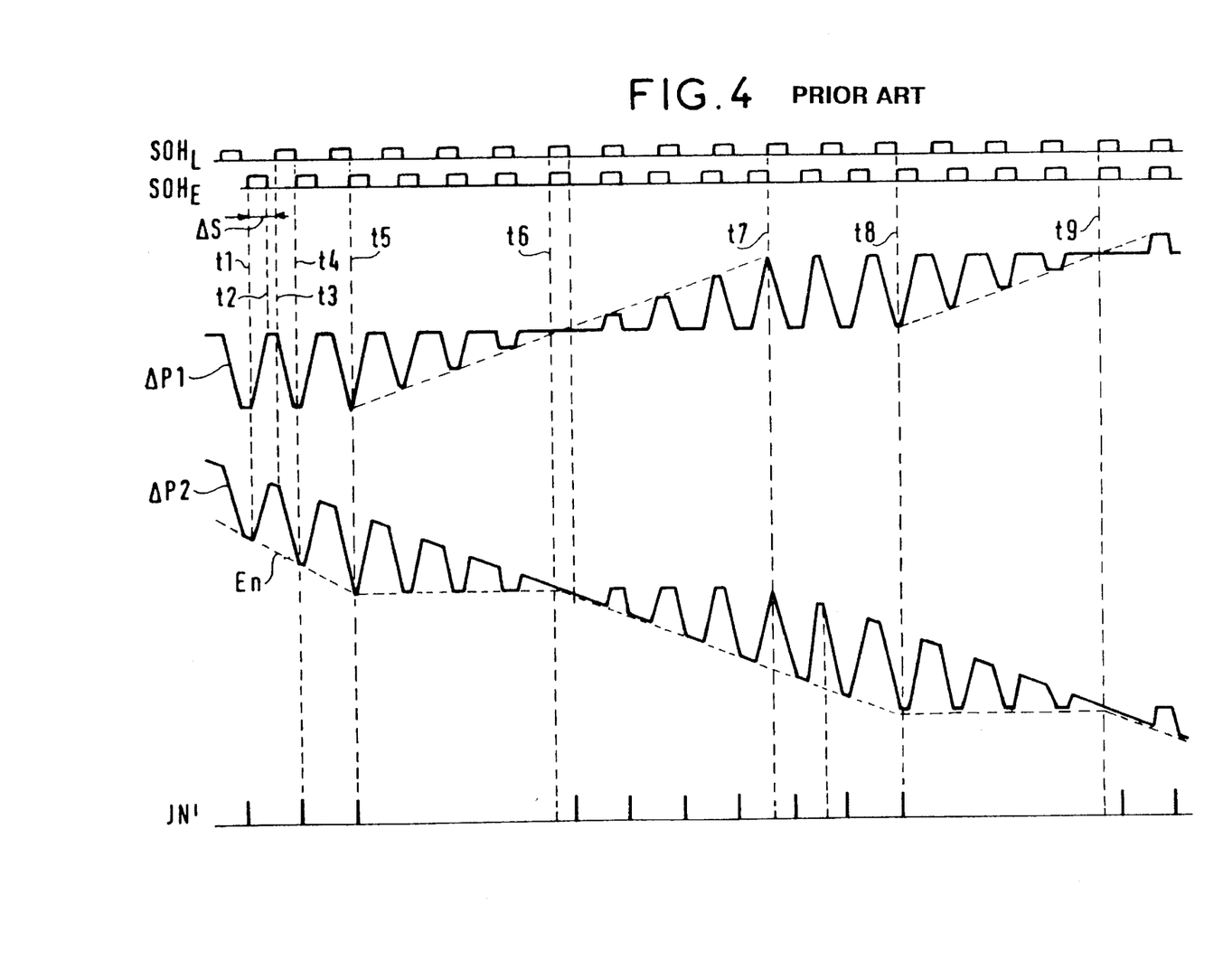
FIGS. 4 and 5 show timing diagrams illustrating the operation of a prior art device with opposite sign phase-shifts between a received header and a sent header.
Figure 5:
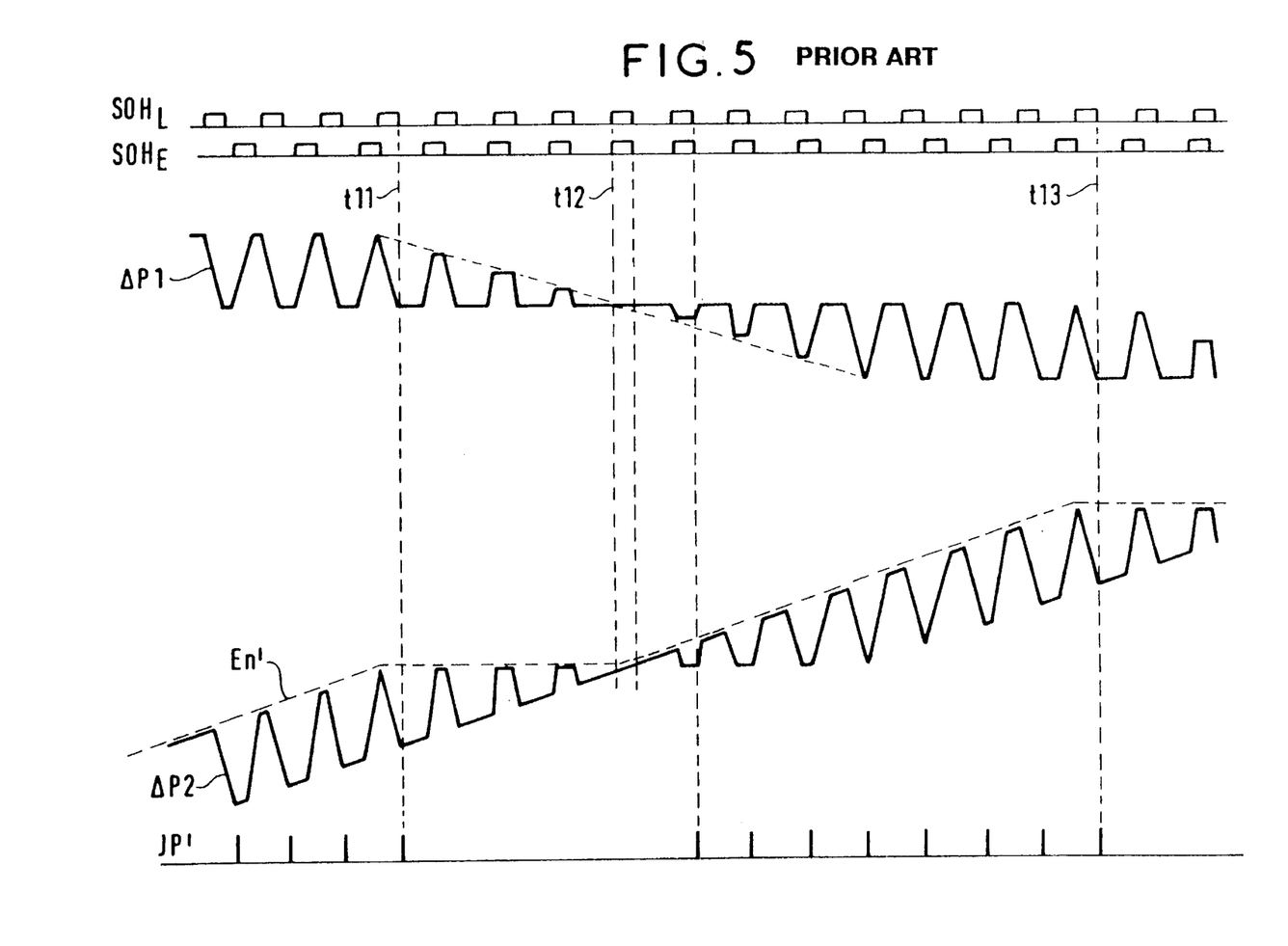

FIGS. 4 and 5 show timing diagrams illustrating why the positive and negative justification command signals JN' and JP', respectively, have this empty interval Tr'. To make the figures clearer they are not to a scale which would make it possible to show the sequence of 87 pulses followed by an absence of three pulses in the justification signals JP' and JN'.

The first line in these diagrams represents the signal $DSOH_L$. The second line represents the signal $DSOH_E$.

Note that the durations of the pulses of the signals $DSOH_L$ and $DSOH_E$ are respectively equal to the durations of the headers $SOH_E$ of the rows respectively received by the input terminal 1 and of the headers $SOH_L$ sent by the output terminal 10 and that the buffer memory 5 stores only the data conveyed and not the headers SOH of the rows conveying the data.

FIG. 4 shows timing diagrams illustrating the operation of a prior art circuit in the situation in which the frequency for reading the rows of a synchronous transport module is less than the frequency for writing these rows. The memory 5 then tends to saturate, but the threshold NF (fixed in the prior art) compensates the effect of this difference between these frequencies.

The third line of the diagram represents the value $\Delta P1$ supplied by the output of the subtractor 12 in the purely theoretical situation in which the write and read clocks $H_E$ and $H_L$, respectively, are at exactly the same frequency. The pointer difference $\Delta P1$ is then due only to the frequency difference between the signals $DSOH_L$ and $DSOH_E$. Consider, for example, the time interval t1t2 which corresponds to the duration of a header $SOH_E$ which is received at the input terminal 1. During this interval the output terminal 10 is sending data and not a header SOH. Consequently the buffer memory 5 tends to empty, resulting in a positive slope of the difference $\Delta P1$ between the read address and the write address.

Consider the time interval t3t4 which corresponds to the duration of a header $SOH_L$ which is then sent to the output terminal 10.

During the interval t2t3 the input terminal 1 receives payload data and the output terminal 10 sends payload data. By hypothesis, the write and read clocks are exactly synchronized, and so the difference $\Delta P1$ remains strictly constant during this interval.

During interval t3t4 the input terminal 1 receives payload data and the output terminal 10 sends a header $SOH_L$. The buffer memory 5 is written although it is not read as the headers $SOH_E$ are not stored in the buffer memory 5 but are determined again by the device 7. Consequently, the difference $\Delta P1$ has a negative slope corresponding to filling of the buffer memory 5.

A sequence of partial filling and emptying of the memory 5 thus occurs, causing oscillation of $\Delta P1$ with a constant amplitude, provided that there is no time overlap of a header $SOH_L$ sent by the output terminal 10 and a header $SOH_E$ received by the input terminal 1.

This overlapping occurs from a time t5 at which the falling edge of the signal $DSOH_L$ coincides with a rising edge of the signal $DSOH_E$ and continues until a time t7 at which this overlapping ends when a rising edge of the signal $DSOH_L$ coincides with a falling edge of the signal $DSOH_E$. During the time interval t5t7 the duration of filling and emptying changes with the phase difference between the signals $DSOH_E$ and $DSOH_L$. The graph of the difference $\Delta P1$ is symmetrical about a time interval in which the pulse of the signal $DSOH_L$ and the pulse of the signal $DSOH_E$ coincide. This interval starts at a time t6 at which the two rising edges coincide.

The difference $\Delta P1$ oscillates with an amplitude which decreases to reach zero at time t6, thereafter increasing up to time t7. From time t7 to time t8 the headers received and the headers sent do not overlap, the value of $\Delta P1$ oscillating with a constant amplitude as during the time interval t1t5.

Consider the time t8 at which the falling edge of the signal $DSOH_L$ virtually coincides with the rising edge of the signal $DSOH_E$. From this time t8 there will again be time overlap between the headers $SOH_L$ of the rows sent at the output terminal 10 and the headers $SOH_E$ received at the input terminal 1. There is again a sequence of partial filling and emptying of the buffer memory 5. The difference ΔP1 oscillates with a decreasing amplitude.

At a time t9 the rising edges of the signals $DSOH_L$ and $DSOH_E$ again coincide. The graph of ΔP1 then passes through a point at which the oscillation amplitude is a null amplitude. After the time t9 there is again a time overlap between the headers of the rows sent and the headers of the rows received and the graph of ΔP1 again includes oscillations of increasing amplitude. The graph of the difference ΔP1 therefore repeats periodically but with an offset increasing in each period.

The curve ΔP2 represents the graph of the difference ΔP2 between the current read address and the current write address assuming there is additionally a difference between the frequencies of the clocks $H_E$ and $H_L$ respectively controlling writing and reading in the buffer memory 5. This difference causes a regular phase slip which is added to the phase difference represented by the curve ΔP1.

To consider the behavior of the comparator 15 relative to the values of the curve ΔP2, consider the envelope En of this curve passing through its minimal values. Its general shape has a negative slope. Each intersection of this envelope with a fixed threshold value NF' commands negative justification, because of the comparator 15. In FIG. 4 the signal JN' represents the negative justification command pulses. The difference ΔP2 includes extrema which cross the threshold NF at regular intervals during the time intervals t1t5 and t6t8 and then beyond time t9. On the other hand, the envelope En has a constant level and consequently does not cross the threshold NF' during the intervals t5t6 and t8t9. There is therefore a gap in the series of pulses of the signal JN' during these two time intervals.

When each row includes a header SOH on 18 half-octets and a payload on 522 half-octets, each period of the negative justification signal JN' includes a series of 87 pulses at regular intervals followed by an empty interval which would correspond to three pulses.

FIG. 5 shows the signals $DSOH_L$, $DSOH_E$, ΔP1, ΔP2 and the signal JP' commanding positive justification if the frequency of the headers $SOH_L$ sent at the output terminal 10 is greater than the frequency of the headers $SOH_E$ received at the input terminal 1. The general shape of the difference ΔP2 then has a positive slope. This difference therefore tends to the cross the threshold NE', which is fixed in the prior are circuit. Consider next the envelope En' which passes through the maximal values of the signal ΔP2. This envelope has two horizontal parts in a time interval t11t12 and in a time interval beyond t13. During these time intervals the maximal values of the difference ΔP2 no longer cross the threshold value NE'. Consequently no positive justification pulses JP' are sent. Each period of the positive justification signal JP' includes a sequence of 87 pulses followed by an empty interval corresponding to three missing pulses.

The time interval T'r shown in FIG. 3 corresponds to the intervals t5t6 and t8t9 in FIG. 4 and to the time intervals t11t12 and t13 . . . in FIG. 5. This interval T'r is characterized by the fact that the headers received $SOH_E$ and the headers sent $SOH_L$ overlap in time, and in that the headers sent $SOH_L$ have a phase delay relative to the headers receive $SOH_E$ during this overlap. This characteristic is used to command variation of the threshold values.

In the circuit of the invention the difference ΔP has the same graph ΔP2 as in the prior art circuit, in the two situations represented in FIGS. 4 and 5. On the other hand, the threshold values are no longer fixed, and vary so that pulses of the negative justification signal JN and the positive justification signal JP are sent during the respective time intervals t5t6 and t8t9, t11t12 and the interval starting at time t13. These variable threshold values are denoted NE and NF.

Figure 6:
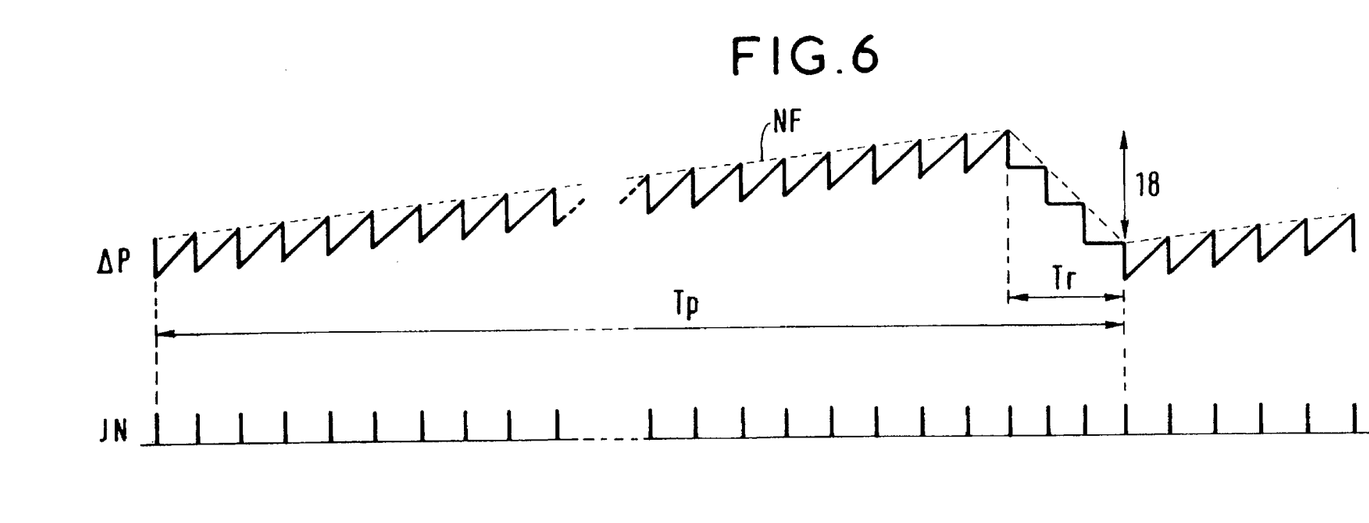
FIG. 6 shows two timing diagrams illustrating the operation of the device of the invention.

FIG. 6 shows a timing diagram illustrating the operation of the circuit of the invention, showing the graph of the difference ΔP and the graph of the variable threshold NF on a first line and pulses of the signal JN commanding negative justification on a second line. The difference ΔP has a period Tp=Tp' having a first part during which it has a sawtooth waveform of constant amplitude but a mean value that increases linearly, the tops of the sawteeth being aligned on the graph of the threshold value NF. This first part comprises 84 teeth. During a second part of duration Tr=Tr' the signal ΔP decreases in three downward steps each having a duration corresponding to the duration of one sawtooth of the first part. The edge of these steps is aligned on a negative slope straight line consisting of the graph of the threshold NF during this second part. The signal JN has no period Tp but a period equal to the duration of each sawtooth and of each step of the signal ΔP. The signal JN still includes 87 pulses during the duration Tp=Tp', but these pulses are regularly distributed.

The variation of the threshold NF forces activation of the negative justification signal JN during each interval Tr. The threshold value NF is reduced by six half-octets each time that negative justification decreases the difference ΔP by six half-octets during this interval Tr. As the value of the threshold NF must remain near the maximal capacity of the memory 5, it is regularly incremented during the remainder of the period Tp so that it is increased by six half-octets during the interval Tp–Tr.

The threshold value NE operative when the buffer memory 5 is nearly empty is similarly modulated.

In the FIG. 2 embodiment the circuit 11 includes, for generating the threshold values NE and NF:

a counter 20 having a clock input receiving the signal $H_L$, an enable input (Val) receiving the signal $DSOH_E$ to start the counter 20 on the rising edge of each row header SOH received at the input terminal 1, a reset input for stopping and resetting the counter 20 on the rising edge of each row header SOH sent at the output terminal 10 and an output supplying a value ΔS;

a register 21 having an input connected to the output of the counter 20 and a clock input receiving the signal $DSOH_L$ to store the value ΔS before the counter is reset;

two function generators 22 and 23, for example two read-only memories, each having an input connected to the output of the register 21 and each having an output supplying the values NE and NF, respectively.

The value ΔS is counted between 0 and 540. It represents, expressed as a number of half-octets, the phase difference between the row headers $SOH_E$ received and the row headers $SOH_L$ sent. There is a time overlap between the received row and sent row headers and there is a phase delay of the headers sent at the output terminal 10 relative to the headers received at the input terminal 1 when ΔS is between 0 and 18 in this embodiment. The interval Tr shown in FIG. 6 therefore corresponds to the values ΔS=0 through 18 (modulo 540).

Figure 7:
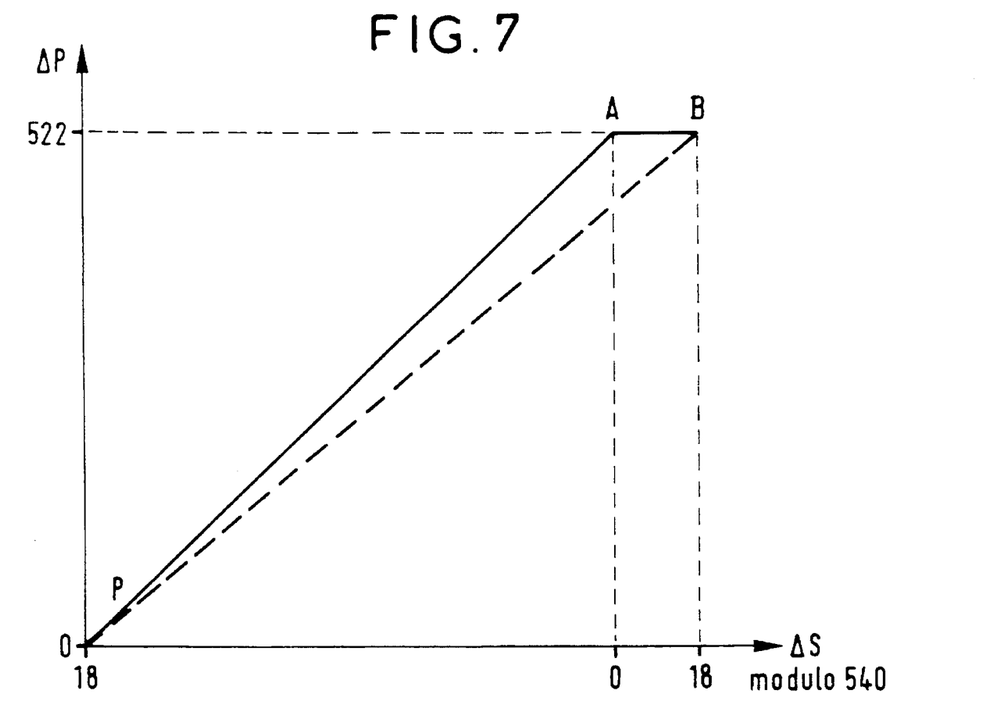
FIGS. 7 and 8 respectively show the filling of the buffer memory and the variation of the first threshold value in one embodiment of a device of the invention when the buffer memory tends to empty.
Figure 8:
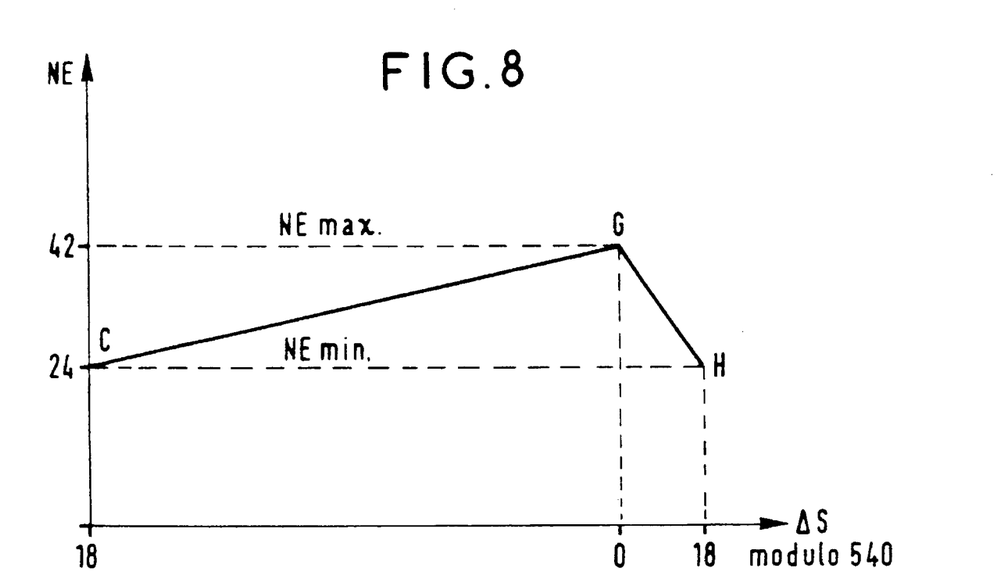

FIGS. 7 and 8 illustrate the operation of the circuit of the invention and in particular the operation of the generator 22 supplying the variable threshold value NE operative when the memory 5 is nearly empty. FIG. 7 shows the graph of the difference ΔP between the two pointers as a function of the difference ΔS if the threshold NE is fixed. This graph is drawn as if it were continuous whereas in reality ΔP and ΔS vary in steps each corresponding to one half-octet.

In FIG. 7 the continuous line plot represents the actual difference ΔP in the buffer memory 5 if the threshold value NE is fixed and the dashed line represents the difference ΔP that would theoretically be required to command positive justification at regular intervals with a fixed threshold NE.

The real difference ΔP includes a first segment PA having a slope equal to 1 for values of ΔS between 18 and 0 modulo 540 half-octets and a null slope second segment AB for the values of ΔS between 0 and 18 modulo 540 half-octets. The graph which theoretically procures a justification command signal at regular intervals is a segment PB whose slope is equal to 522/540 and which corresponds to all of the range of values of ΔS from 0 through 540 half-octets.

FIG. 8 shows the graph of the threshold NE as a function of ΔS for procuring a positive justification command signal at regular intervals, compensating by a variation of the threshold NE the fact that the graph PAB is not coincident with the graph PB. It includes a segment CG in which the threshold NE varies from NEmin to NEmax as ΔS varies from 18 to 0 modulo 540 half-octets and a segment GH in which the threshold NE decreases from NEmax to NEmin as ΔS varies from 0 to 18 modulo 540 half-octets. To compensate for the fact that the graph PAB is not coincident with the graph PB, because of the segment AB whose length is equal to 18 half-octets, it is necessary and sufficient for NEmax−NEmin=18 half-octets. The mean value of NE is chosen to suit the capacity of the buffer memory 5. For example, NEmin=24 and NEmax=42 half-octets for a memory 5 having a capacity of 128 half-octets.

Figure 9:
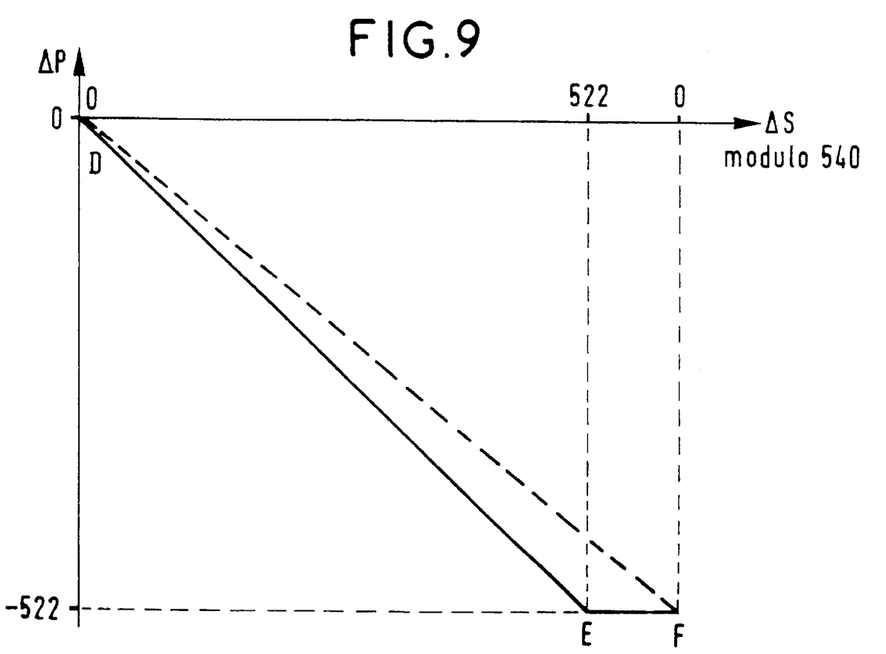
FIGS. 9 and 10 respectively show the filling of the buffer memory and the variation of the second threshold value in the same embodiment of the invention when the buffer memory tends to saturate.
Figure 10:
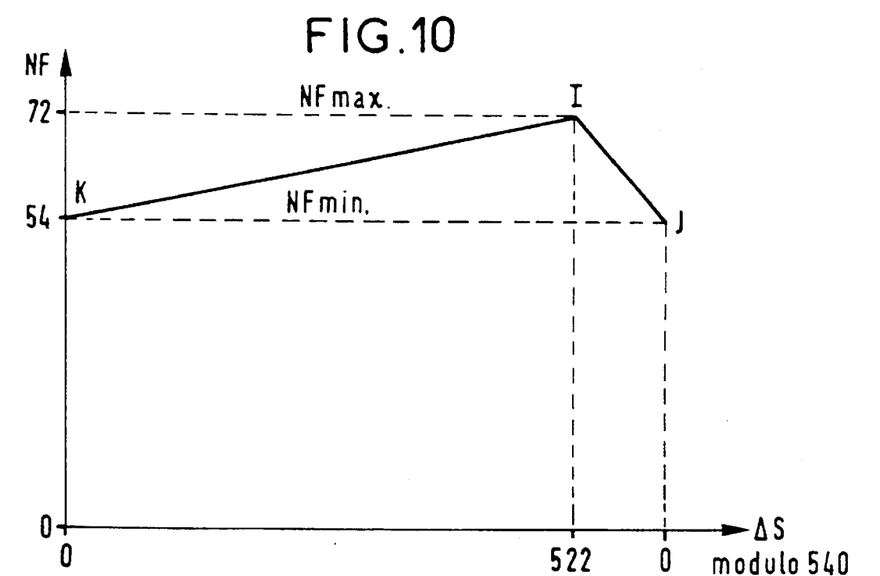

FIGS. 9 and 10 show in a similar way the operation of the circuit 11 when the buffer memory 5 is approaching saturation. FIG. 9 shows the graph of the difference ΔP as a function of the difference ΔS, varying between 0 and 540 half-octets, if the threshold NF is fixed. The graph of the real difference includes a first segment DE having a slope equal to −1, the difference ΔP varying from 0 to −522 as ΔS varies from 0 to 522 half-octets, and a null slope second segment EF at ordinate ΔP=−522 for values of ΔS between 522 and 0 modulo 540 half-octets. The graph of the difference ΔP that would theoretically be needed to command negative justification at regular intervals with a fixed threshold NF is a segment DF corresponding to a variation of the difference ΔP from 0 to −522 half-octets for a variation of ΔS from 0 to 540 modulo 540 half-octets.

FIG. 10 shows the graph of the threshold NF as a function of the difference ΔS for commanding negative justification at regular intervals. The graph includes a first segment KI increasing from a value NFmin to a value NFmax for ΔS varying from 0 to 522 half-octets and a segment IJ decreasing from NFmax to NFmin for ΔS varying from 522 to 540 half-octets. The amplitude NFmax−NFmin which is necessary and sufficient for compensating the effect of the segment EF is equal to 18 half-octets. The mean value of the threshold NF is chosen to suit the capacity of the buffer memory 5 which is used. For example, NFmin=64 half-octets and NFmax=82 half-octets for a memory 5 having a capacity of 128 half-octets.

The function generators 22 and 23 can each comprise a read-only memory containing the values corresponding to the graphs shown in FIGS. 8 and 9.

The embodiment of the invention described above and shown in FIG. 2 procures justification at perfectly regular intervals in a gateway of a synchronous network provided that the digital bit stream has not previously been subjected to justification at irregular intervals, because in this case this earlier justification would disrupt the regularity of the justification in the signal output by the circuit shown in FIG. 2.

Figure 11:
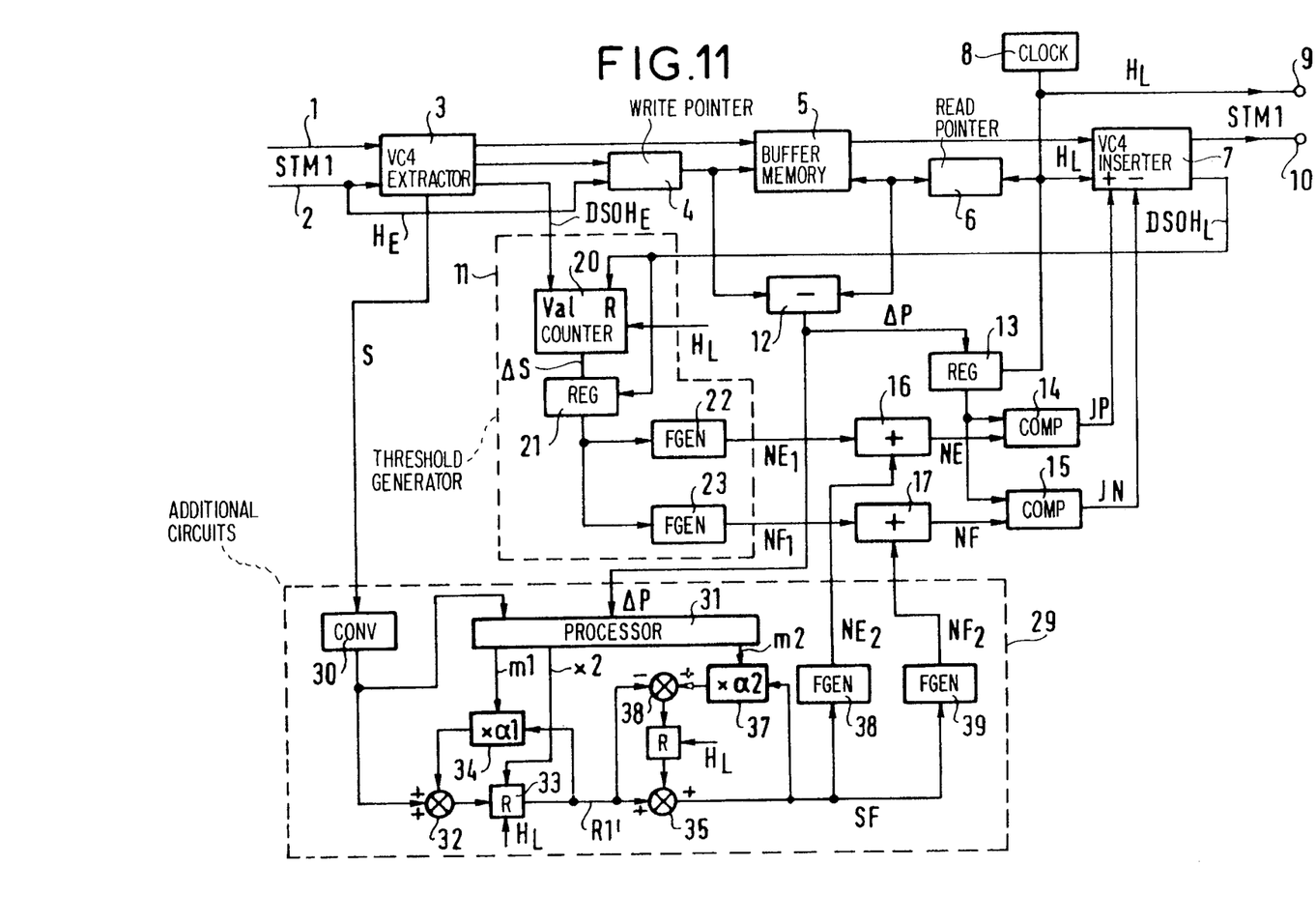
FIG. 11 shows the block diagram of a variant of the FIG. 2 embodiment of the invention.

FIG. 11 shows the block diagram of a variant of the device of the invention which attenuates the effects of earlier justification on the regularity of the justification effected in a given gateway. This variant includes the same circuits as shown in FIG. 2 and additional circuits because the threshold values NE and NF now each have two components:

$$NE=NE_1+NE_2$$
$$NF=NF_1+NF_2$$

The values $NE_1$ and $NF_1$ are supplied by the circuit 11 described previously. The values $NE_2$ and $NF_2$ are supplied by additional circuits 29. The threshold values NE and NF are calculated by means of two extra adders 16 and 17.

The additional circuit 29 include:

a circuit 30 having an input connected to an output of the virtual container extractor 3 to convert a positive-negative justification indicator signal S into a predetermined positive or negative value when it indicates positive or negative justification, respectively;

a processor 31 having a first input connected to an output of the circuit 30 and a second input connected to the output of the subtractor 12 to receive the value of the difference ΔP between the current write address and the current read address;

an adder 32 having two inputs a first of which is connected to the output of the circuit 30;

a register 33 having a data input connected to an output of the adder 32, a clock input receiving the clock $H_L$ and a shift control input connected to an output of the processor 31;

a multiplier 34 having an input connected to the output of the register 33, an input connected to an output of the processor 31 supplying it a parameter value m1 and an output connected to the second input of the adder 32;

a subtractor 35 having two inputs one of which is connected to the output of the register 33;

a multiplier 37 having an input connected to an output of the adder 37 and an input connected to an output of the processor 31 supplying it a parameter value m2;

a subtractor 38 having two inputs of which a "+" input is connected to an output of the multiplier 37 and a "−" input is connected to the output of the register 33;

a register 36 having a data input connected to an output of the adder 38, a clock input receiving the clock signal $H_L$ and an output connected to the second input of the adder 35;

two function generators 38 and 39 having a common input connected to the output of the adder 35 and each having an output supplying the values $NE_2$ and $NF_2$, respectively, to the inputs of the adders 16 and 17, respectively.

The components 31 through 38 constitute a two-stage variable-bandwidth high-pass digital filter. In the first stage the multiplier 34 multiplies by a coefficient $\alpha 1=1-\frac{1}{2}^{m1}$. In the second stage the multiplier 37 multiplies by a coefficient $\alpha 2=1-\frac{1}{2}^{m2}$.

The buffer memory 5 may saturate during transients. The processor 31 widens the bandwidth of the filter 31 to 37 during transients to prevent this. It widens the bandwidth of the filter 31 to 37 by reducing the value of the parameters m1 and m2 when a transient causes an increase in the filling of the buffer memory 5.

The processor 31 compares the value of the difference ΔP reflecting how full the buffer memory 12 is to three predetermined threshold values S1, S2, S3. The processor 31 supplies the following parameter values m1, m2:

| m1 | m2 | ΔP |
|---|---|---|
| 16 | 16 | if ΔP < S1 |
| 14 | 13 | if S1 ≦ ΔP < S2 |
| 12 | 11 | if S2 ≦ ΔP < S3 |
| 11 | 10 | if S3 ≦ ΔP |

During a transient the value ΔP successively crosses the threshold values S1, S2, S3. The processor 31 switches the values m1 and the values m2 as soon as the threshold values are crossed.

The values m1=11 and m2=10 procure a bandwidth of the filter 31 through 37 which is wide enough for a transient not to cause the buffer memory 5 to overflow (in this example the buffer memory has a capacity of 128 half-octets).

In a preferred embodiment of the invention the processor 31 decrements only one of the parameters m1 and m2 at a time. It modifies the values m1 and m2 as shown in the following table, for example:

| m1 | m2 | ΔP |
|---|---|---|
| 16 | 16 | ΔP < S1' |
| 14 | 16 | S1' ≦ ΔP < S2' |
| 14 | 13 | S2' ≦ ΔP < S3' |
| 12 | 13 | S3' ≦ ΔP < S4' |
| 12 | 11 | S4' ≦ ΔP < S5' |
| 11 | 11 | S5' ≦ ΔP < S6' |
| 11 | 10 | S6' ≦ ΔP |

Changing the values of the parameters m1 and m2 alternately minimizes the phase jitter created by changing the characteristics of the filter 31 through 37. In the case of a high-amplitude transient the difference ΔP crosses several threshold values very quickly and the processor 31 then skips several values of m1 and m2.

In a preferred embodiment of the invention each time that the processor 31 decreases the value of the parameter m1 by k units (where k is an integer) it simultaneously commands a shift in the register 33 in order to divide the content of this register by $2^k$. This instantaneously divides by $2^k$ the value R1' supplied by this first stage of the filter and therefore reduces the time needed for stabilization of the value R1' supplied at the output of the first stage of the filter. It can be shown that this value is proportional to $2^{m1}$. When m1 is incremented by one unit the value supplied by this first stage tends asymptotically towards a value which is doubled. Multiplying by $2^k$ the value supplied by the output of the first stage moves the value obtained much closer to its final value. The value obtained therefore reaches the final value corresponding to the new value of m1 faster.

Figure 12:
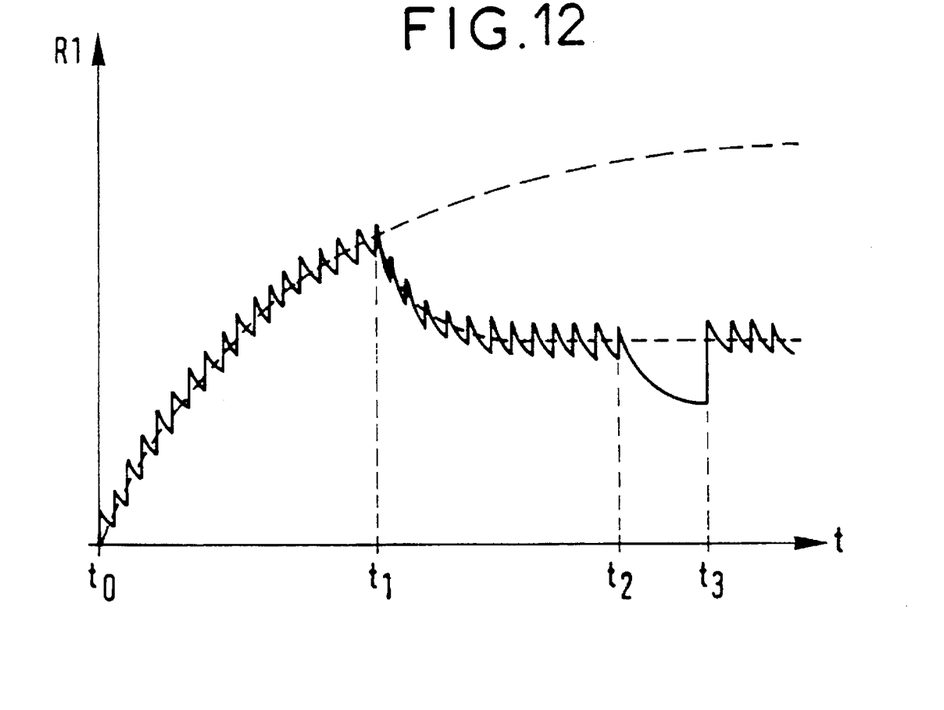
FIGS. 12–15 illustrate the operation of this variant.
Figure 13:
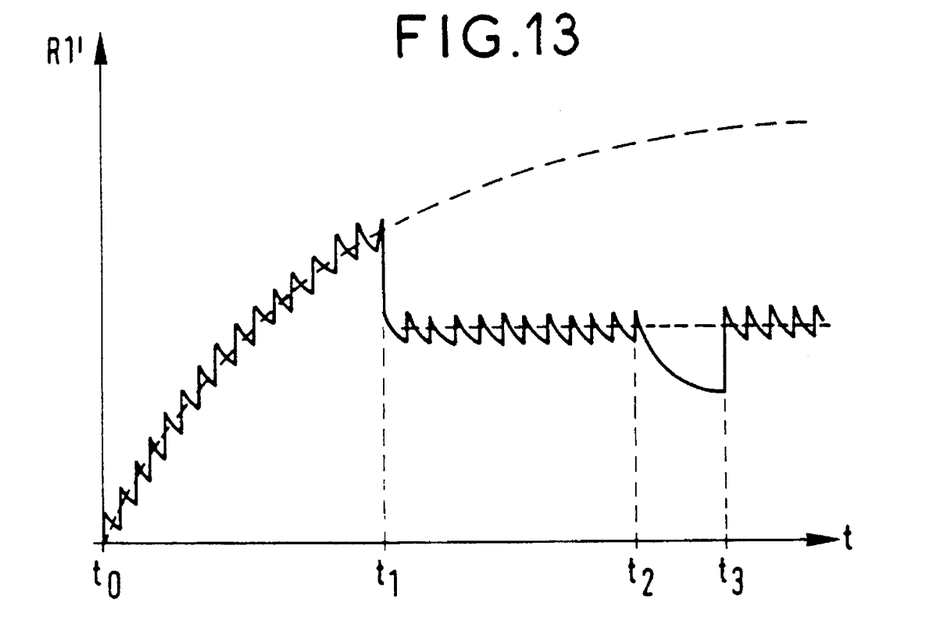

FIGS. 12 and 13 illustrate the operation of the first stage 32, 33, 34 of the filter 7' in this variant of the invention at the time of a transient.

FIG. 12 shows the graph of the value R1 supplied by the output of the first stage when the parameter m1 is decremented without dividing by two the value supplied by the output of the first stage. FIG. 13 shows the graph of the value R1' supplied by the output of the first stage when the value R1' is divided by two by a shift in the register 33 at the time when the value m1 is decremented.

A sequence of 87 positive or negative justifications begins at time $t_0$, each justification corresponding to a sawtooth having a segment of practically infinite positive slope and a segment of exponentially decreasing negative slope. At time $t_1$ the value m1 is incremented by one unit. During the time interval $t_0 t_1$ the envelope of the graph of R1 has an increasing exponential shape with a time constant which is the same for both figures.

In the situation shown in FIG. 12, at time $t_1$ the processor 31 detects that the difference ΔP is now greater than a threshold value. The processor 31 reduces the value m1 by one unit to increase the bandwidth of the filter 7'. The time constant is therefore reduced. The graph of R1 therefore tends asymptotically towards the same final value resulting from the change to m1, but with a steeper slope.

In the situation shown in FIG. 13 the division by two causes a sudden reduction in the value R1' supplied by the first stage to a value very close to the final value (to within a few percent of the latter). The value R1' supplied by the first stage therefore stabilizes faster, which reduces the phase jitter caused by changing the value m1.

FIGS. 12 and 13 also show the variation in the respective values R1 and R1' supplied by the first stage between the times $t_2$ and $t_3$ between which there is no justification. The absence of justification causes a decrease in the values R1 and R'1. This stops at the beginning of a new sequence of justifications.

Each decrementing of the parameters m1 and m2 by the processor 31 occurs in phase with the signal S indicating a justification in order to reduce the error due to a division effected by means of a shift in the register 33.

When the transient event which has caused the filling of the memory 12 is terminated, the processor 31 detects that the value ΔP is now below the highest threshold value it reached during the transient. It starts a timer. When it registers that this event has lasted a duration $T_0$ it changes the values of the parameters m1 and m2 in a predetermined sequence which is dependent only on time: every $T_1$ seconds it increments the value of m1 by one unit; it then increments the value of m2 by one unit with an initial offset of $T_1/2$, and thereafter at regular intervals of $T_1$ seconds, to revert to the initial values m1=16 and m2=16 in order to reduce the bandwidth of the filter 7'. Offsetting the incrementing of m1 and m2 reduces the phase jitter produced by changing the characteristic of the filter, corresponding to each change of value of m1 or m2.

To minimize the phase jitter generated by changing the parameters m1 and m2 they are incremented stepwise by one unit.

When the value of m1 is incremented by one unit the processor 31 commands the register 33 to perform a shift to multiply by two the value R1' supplied by the output of the first stage of the filter.

Figure 14:
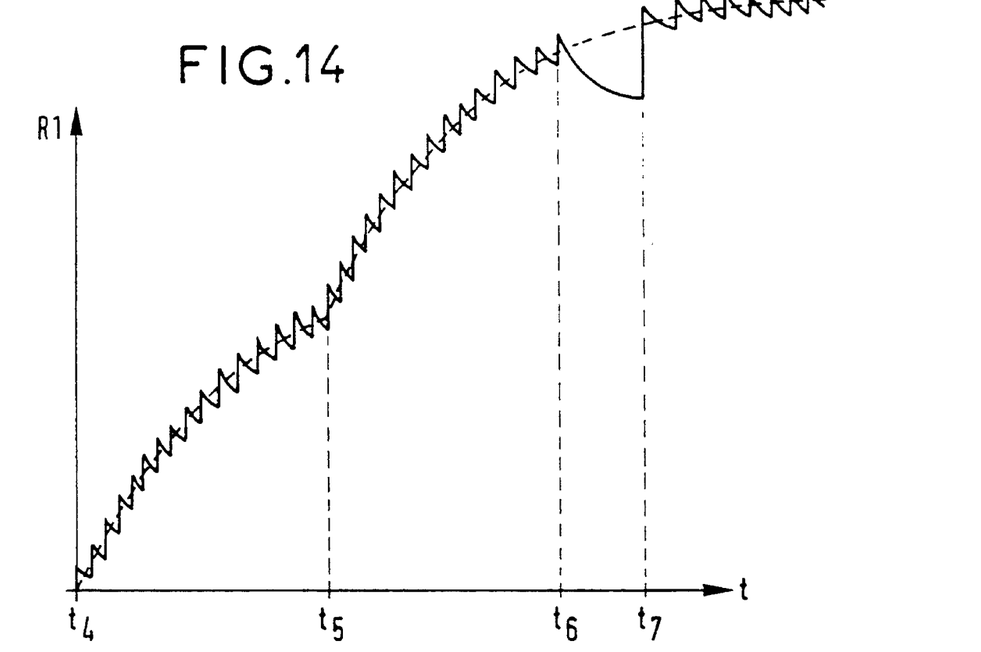

FIG. 14 shows the graph of the value R1 supplied by the output of the first stage 32, 33, 34 of the filter during the return to the stable state, in the absence of shifting in the register 33. A sequence of 87 positive or negative justification begins at time $t_4$. At time $t_5$ the value m1 is decremented by one unit. During the time interval $t_4 t_5$ the envelope of the graph of R1 has an increasing exponential shape. After time $t_5$ it has a decreasing exponential shape with a steeper slope. The graph then tends asymptotically towards the same final value but with a steeper slope.

Figure 15:
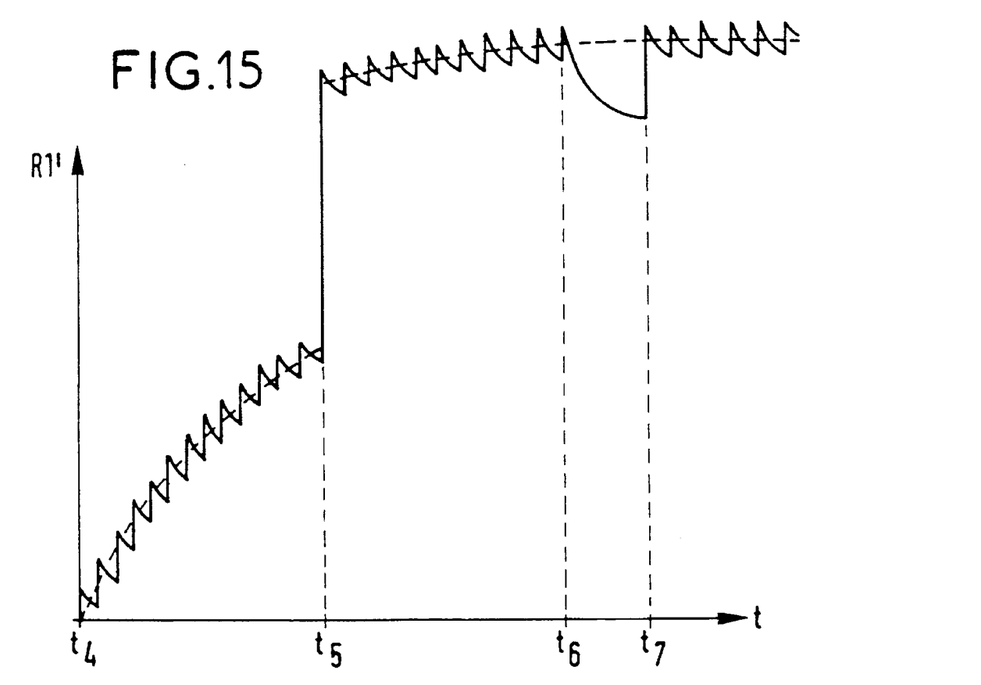

FIG. 15 shows the graph of the value R'1 supplied by the output of the first stage 32, 33, 34 of the filter during this return to the stable state but with a shift of one bit in the register 33. The multiplication by two increases the value R1' supplied by the first stage to a value very close to the final value (to within a few percent of the latter). The value R1' supplied by the first stage therefore reaches a stable state faster, which reduces the phase jitter caused by changing the value of m1.

FIGS. 14 and 15 also show the variation in the respective values R1 and R1' supplied by the first stage between times $t_6$ and $t_7$ between which there is no justification. The absence of justification temporarily reduces the values R1 and R1'.

The processor 31 increments the parameter m1 in phase with the arrival of the justification indication signal S in order to minimize calculation errors during the multiplication effected by means of a shift in the register 33. This synchronization enables the use for the multiplication of a value as close as possible to the final value.

For the same reason, before incrementing the parameter m1 or m2 the processor 31 checks that there has been no gap in the sequence of justifications during the timer period $T_0$. It is essential to ensure that this check does not inhibit the facility to increment the parameters m1 and m2 during a long period with no justification and during which the buffer memory could saturate or empty.

To this end, the processor 31 continuously compares the value $\Delta P$ with a high threshold value and a low threshold value and instigates decrementing of the parameters m1 and m2 immediately if either threshold value is crossed. The high threshold value is fixed at a value greater than S'6 and the low threshold value is fixed at a value less than S'0 in this example.

To prevent the filter bandwidth remaining widened, the processor 31 starts a timer on the arrival of each justification signal S. If this signal disappears during a fixed time T2 and no threshold is crossed during this time the processor 31 starts the sequence of changing m1 and m2 to return the filter to the initial state.

The circuit 29 supplies variable threshold values NE2 and NF2 which respectively vary in the same ranges as the values NE1 and NF1, but they vary in sympathy with the filtered signal S in order to command additional justification to make any good absences of justification found in the sequences of 87 consecutive justifications that the terminal 1 should receive.

The function generators 22 and 23 of the variant shown in FIG. 11 supply values NE1 and NF1 which are respectively equal to the values NE and NF whose graphs are shown in FIGS. 8 and 10.

Figure 16:
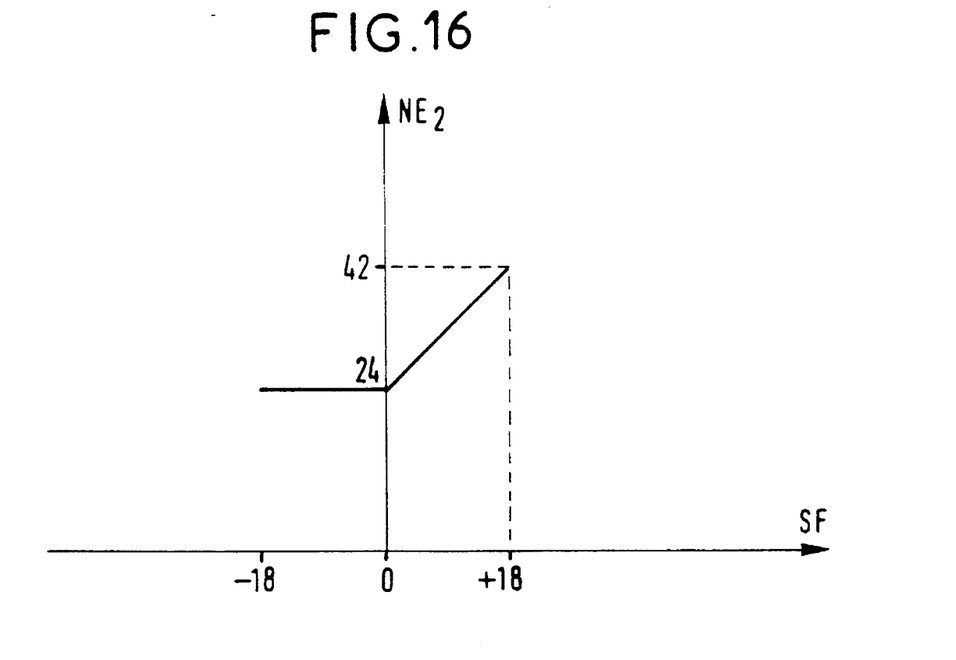
FIGS 16 and 17 show the graphs of the variable threshold values as function of the filtered signal value.

FIG. 16 shows the graph of the function NE2 generated by the function generator 38 as a function of the value SF of the signal filtered by the filter 31 through 37. For negative values of the filtered signal the generator 38 supplies a constant value NE2 equal to 24 half-octets. For positive values it supplies a value NE2 increasing linearly with a slope equal to +1; a variation from 0 to +18 of the filtered signal causes NE2 to be increased from 24 to 42 half-octets. The values supplied by the analog-digital converter 30 are chosen such that the amplitude of the filtered signal remains between −18 and +18.

Figure 17:
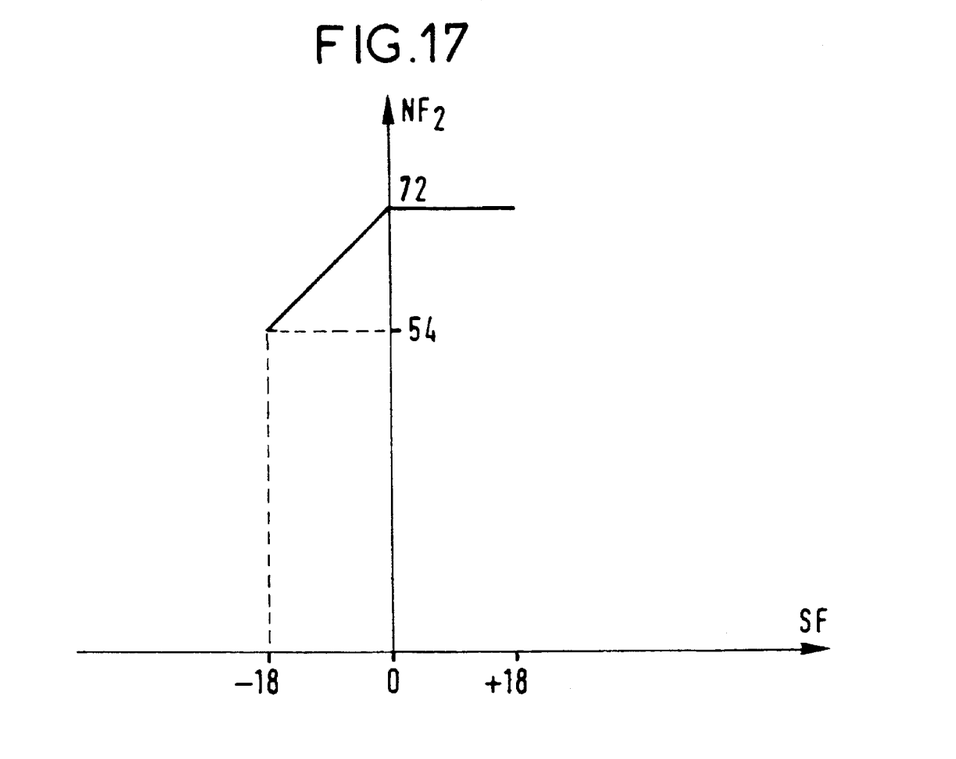

FIG. 17 shows the graph of the function NF2 generated by the function generator 39. For positive values of the filtered signal SF it supplies a constant value NF2 equal to 72 half-octets. For negative values of the filtered signal SF it supplies a value NF2 increasing with a slope equal to +1: for a variation from −18 to 0 of the filtered signal SF it supplies a value NF2 increasing from 54 to 72 half-octets. The values $NE_2$ and $NF_2$ therefore vary with an amplitude of 18 half-octets, like the values $NE_1$ and $NF_2$.

In a preferred embodiment of the invention the function generators 22 and 23 are further controlled by the difference $\Delta P$ reflecting how full the buffer memory is, so that they supply only one threshold value at a time: NF if the buffer memory is full to more than half its capacity or NE if the buffer is full to less than half its capacity. In this way it is possible to double the amplitude of variation of the thresholds without reducing the range within which the filling of the buffer can vary without commanding justification, as compared with the situation in which both thresholds NE and NF are supplied simultaneously to the respective comparators 14 and 15.

In one embodiment of the invention the functions of the function generators 22, 23, 38, 39 can be interchangeable to generate specific functions intended to procure justification in specific sequences for testing equipment of the downstream synchronous network.

There is claimed:

1. A device for justifying at regular intervals a digital bit stream received from a first synchronous link timed by a first clock and to be sent on a second synchronous link timed by a second clock, said digital bit stream comprising a continuous sequence of rows of bits, each row comprising a fixed total number of bits but including a payload comprising a variable number of bits and a header comprising a variable number of bits, the numbers of bits varying according to whether said row has been subjected to positive justification, negative justification or no justification, the device including:

a buffer memory into which said payload is written under the control of said first clock and from which said payload is read under the control of said second clock;

means for calculating a filling value indicative of how full said buffer memory is;

means for comparing said filling value to first and second variable threshold values to produce a negative justification command signal when it is greater than said first threshold value and to produce a positive justification command signal when it is less than said second threshold value; and means for determining the first and second variable threshold values according to the phase difference between the header of a row received from said first link and the header of a row sent on said second link.

2. A device according to claim 1, wherein said means for determining said first and second threshold values include:

means for supplying a value representing the phase difference between the header of a row received and the header of a row sent; and two first function generators operating under the control of said value representing said phase difference and supplying respective threshold values.

3. A device according to claim 2, wherein each of said two function generators generates a sawtooth function and a first slope of the sawtooth corresponds to a first time interval in which said phase difference between the header of a row received and the header of a row sent is such that the latter header has a phase delay relative to the former header and the two headers overlap in time, and a second slope of the sawtooth corresponds to a second time interval in which the above two conditions are not satisfied simultaneously.

4. A device according to claim 1, wherein said means for determining said first and second variable threshold values are also responsive to a justification indicator signal indicating whether a row has been subjected to justification or not.

5. A device according to claim 4, wherein said means for determining said first and second threshold values include:

a counter supplying a value representing said phase difference between the header of a row received and the header of a row sent;

two first function generators operating under the control of said value representing said phase difference and supplying respective values;

a high-pass digital filter for filtering said justification indicator signals;

two second function generators operating under the control of the filtered signal and supplying respective values; and means for calculating said first and second threshold values by respectively adding a value supplied by said first function generators and a value supplied by said second function generators.

6. A device according to claim 5, wherein said digital filter is a variable bandwidth high-pass filter in which the bandwidth is determined by the value of at least one parameter, the device including means for determining the value of each filter parameter according to how full said buffer memory is, in order to increase the bandwidth of said filter if a transient tends to saturate said buffer memory.

7. A device according to claim 6, wherein said means for determining the value of at least one parameter modify the value of at least one parameter in a direction to increase said bandwidth if said memory is full to above a predetermined threshold, and in synchronism with justification, in order to modify the value of said parameter just before a justification and modify the value of at least one parameter in a direction to reduce said bandwidth:

if the buffer becomes full to less than a predetermined threshold value; and if the above condition is satisfied for a predetermined time; and if they detect a series of justifications with no interruption during said predetermined time.

8. A device according to claim 6, wherein the bandwidth of said filter is determined by at least two parameters and said means for determining the value of each filter parameter compare said filling value to a plurality of separate fixed threshold values and modify only one parameter at a time when said filling value becomes respectively greater than or less than a threshold value.

9. A device according to claim 6, wherein said filter includes at least two stages and the final value supplied by a first stage is respectively multiplied or divided by two when the value of a parameter is increased or decreased by one unit, and wherein said first stage further includes means for multiplying or dividing by $2^k$ the value supplied by said first stage according to whether said means for determining the value of each filter parameter determine for said first stage a parameter modification equal to +k or −k, respectively, where k is a non-null integer.

10. A device according to claim 5, wherein said justification indicator signal temporarily assumes values of opposite sign to indicate positive justification and negative justification, respectively, and assumes a null value in the absence of any justification, and said second function generators respectively generate the following functions:

a function increasing linearly with the filtered justification signal when the latter indicates positive justification and having a predetermined fixed value when it indicates negative justification or no justification; and a function increasing linearly with the filtered justification signal when the latter indicates negative justification and having a predetermined fixed value when it indicates positive justification or no justification.

\* \* \* \* \*